US005367287A

United States Patent [19]

Blossom et al.

[11] Patent Number: 5,367,287

[45] Date of Patent: Nov. 22, 1994

[54] DEVICE FOR MARKING MOTOR VEHICLES

[76] Inventors: Rick L. Blossom, 5752 David Pl., Fairfield, Ohio 45014-3508; Michael T. Riley, 648 Rockford Dr., Hamilton, Ohio 45013

[21] Appl. No.: 763,315

[22] Filed: Sep. 20, 1991

[51] Int. Cl.[5] .............. B60R 25/10

[52] U.S. Cl. .............. 340/429; 340/571; 116/211

[58] Field of Search .............. 340/425.5, 426, 429, 340/568, 571, 574, 436; 116/211, 214, 28 R, 2; 109/25, 27-32, 34; 118/300

[56] References Cited

U.S. PATENT DOCUMENTS

| | | | |
|---|---|---|---|
| 2,041,577 | 5/1936 | Sutherland | 340/571 X |
| 2,836,143 | 5/1958 | Shofi | 116/211 |
| 3,053,416 | 9/1962 | Harner | 116/2 |
| 3,424,122 | 1/1969 | DeAngelis | 116/2 |
| 3,564,525 | 2/1971 | Robeson et al. | 109/25 |
| 3,945,341 | 3/1976 | Jackson | 118/300 X |
| 4,559,529 | 12/1985 | Bernhardt | 340/571 |
| 4,725,823 | 2/1988 | Persson | 340/571 |
| 5,001,456 | 3/1991 | Bereza | 340/425.5 |

*Primary Examiner*—Hezron E. Williams
*Assistant Examiner*—Christine K. Oda

[57] ABSTRACT

A device for marking motor vehicles in order to assist law enforcement officers in identifying and apprehending a motor vehicle that has illegally fled after being stopped. The vehicle marking device comprises plastic pouches or sacs containing dye, and explosive cartridges such as model rocket propellant for rupturing the pouches and expelling the dye onto an exterior surface of a motor vehicle. An electronic control for firing the explosive cartridges includes a master switch for arming and disarming the marking device, an inertia switch for detecting motion of the motor vehicle, and a timer for delaying firing of the explosive cartridges for a predetermined period of time after the inertia switch detects motion.

6 Claims, 3 Drawing Sheets

DEVICE FOR MARKING MOTOR VEHICLES

FIELD OF THE INVENTION

This invention relates generally to law enforcement and, in particular, to a device for positively marking motor vehicles that unlawfully flee after being stopped by law enforcement officers.

BACKGROUND OF THE INVENTION

Whenever a law enforcement officer stops a motor vehicle for a traffic violation, there is a possibility that the occupants of the stopped vehicle will decide to flee the scene unlawfully. If the law enforcement officer is incapacitated or killed by the occupants of the stopped vehicle before they flee, later identification of the stopped vehicle may be difficult or even impossible.

Prior devices for identifying motor vehicles have included signals or flags as disclosed in U.S. Pat. Nos. 3,320,920 to Lusebrink; 4,080,924 to LeClaire; and 4,624,211 to Jokel. While these devices work satisfactorily in certain situations such as identifying a vehicle in a large parking lot, they are not suitable for use in law enforcement because they may be easily removed from the vehicle.

Other devices have existed for immobilizing or disabling motor vehicles. These devices include wheel clamps such as disclosed in U.S. Pat. Nos. 4,723,426 to Beaudoin; 4,833,442 to Von Heck; and 4,913,265 to Richards. Although these devices are acceptable in some situations they are difficult to install quickly.

SUMMARY OF THE INVENTION

It is an object of the present invention to give law enforcement officers an advantage in visually identifying and apprehending any motor vehicle that has illegally fled after being stopped.

The present invention provides a device for marking motor vehicles including a sac containing dye, explosive means for rupturing the sac and expelling the dye onto an exterior surface of a motor vehicle, and electronic control means for firing the explosive means. The electronic control means includes a master switch for arming and disarming the marking device, an inertia switch for detecting motion of the motor vehicle, and timer means for delaying firing of the explosive means for a predetermined period of time after the inertia switch detects motion. The marking device is a portable, self-contained unit having a container for holding the dye sac, the explosive means, indicator lights and the electronic control means. Means such as a suction cup is fastened to the container for attaching the portable unit to the exterior surface of the motor vehicle.

DESCRIPTION OF THE PREFERRED EMBODIMENT

Figure 1:
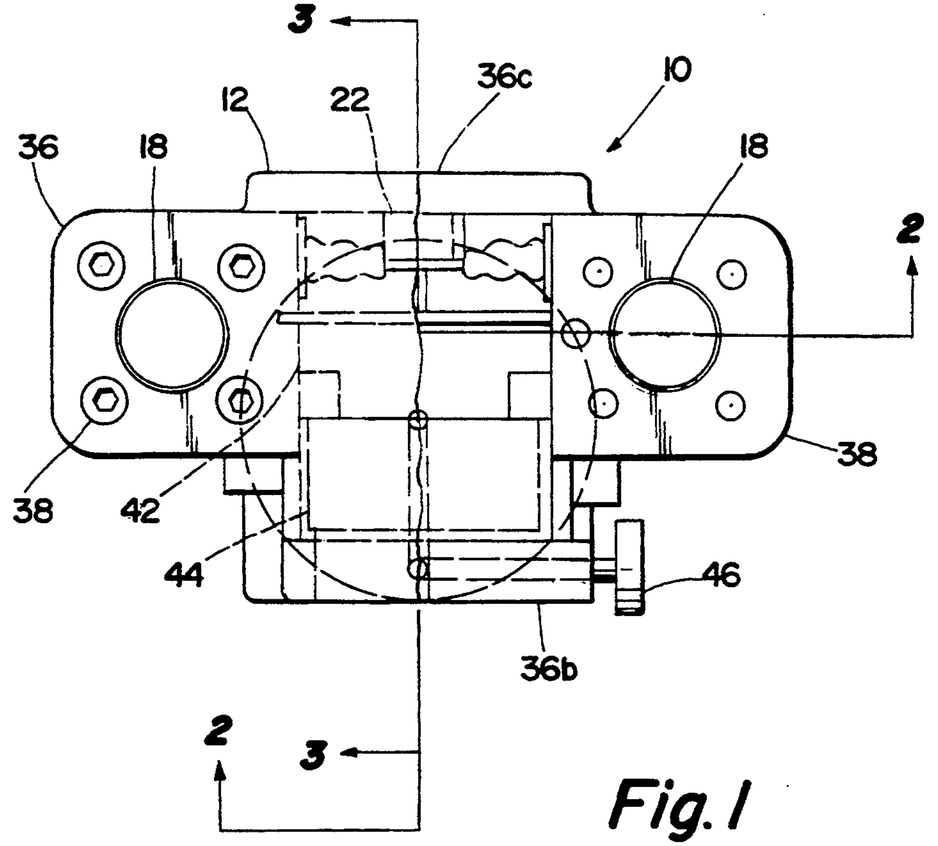
FIG. 1 is a top view of a vehicle marking device according to the preferred embodiment of the present invention.
Figure 2:
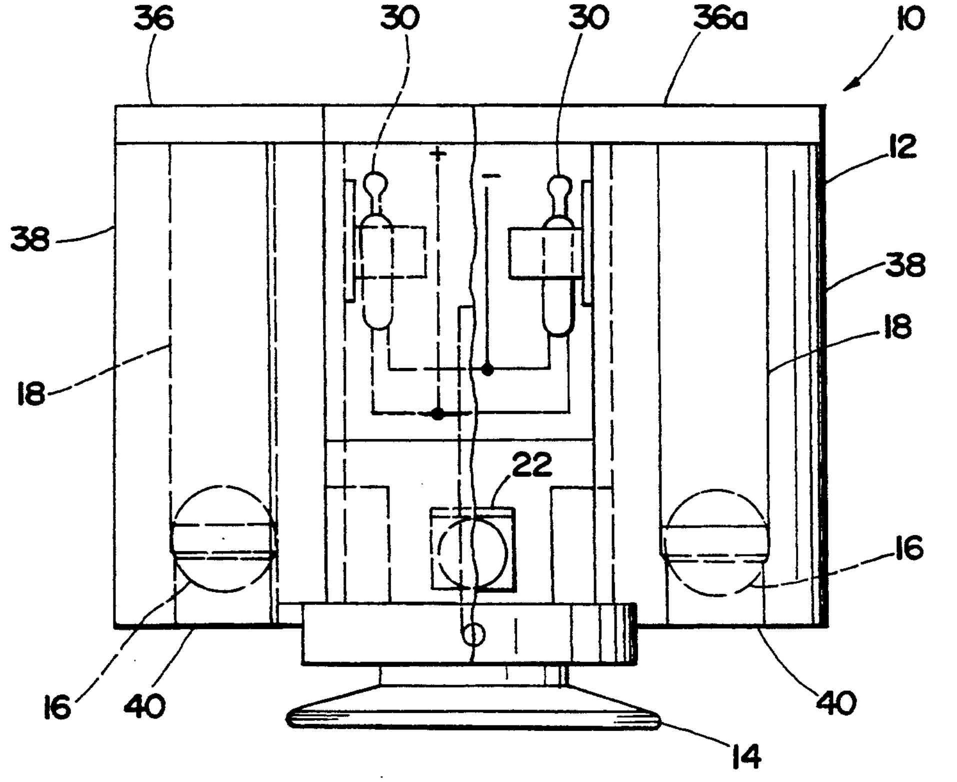
FIG. 2 is a sectional view taken along lines 2—2 in FIG. 1.
Figure 3:
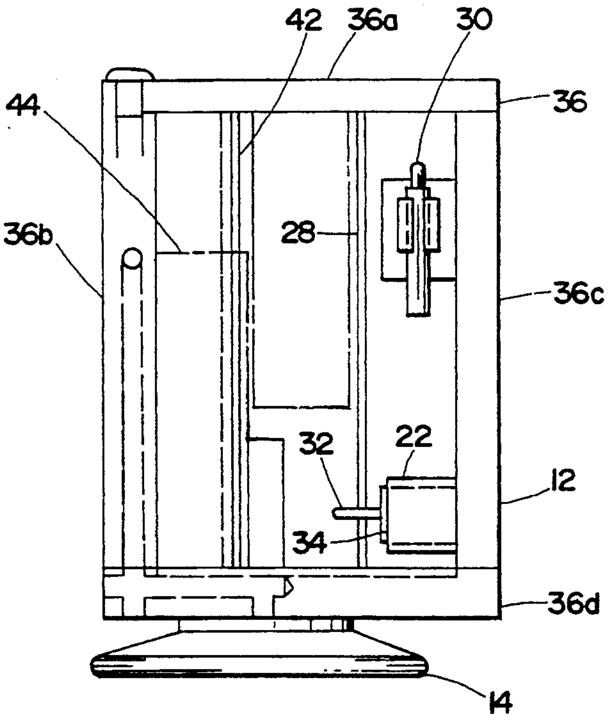
FIG. 3 is a sectional view taken along lines 3—3 in FIG. 1.
Figure 4:
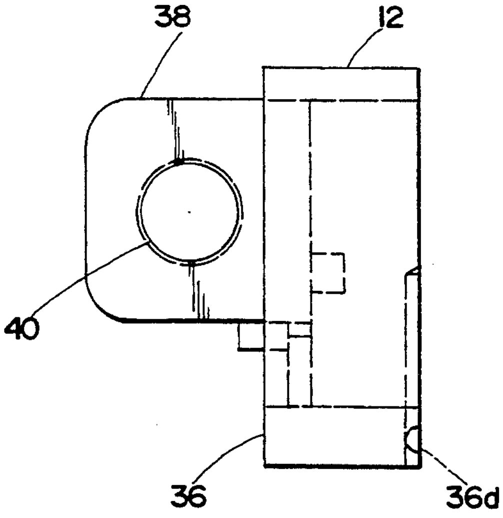
FIG. 4 is a partial bottom view of the vehicle marking device.
Figure 6:
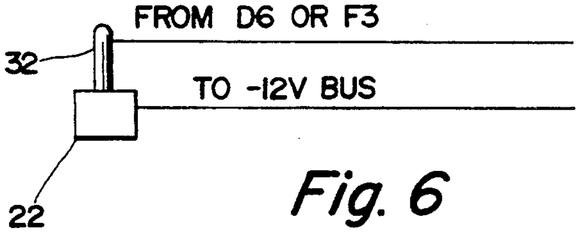
FIGS. 6-8 are wiring diagrams for the vehicle marking device.
Figure 7:
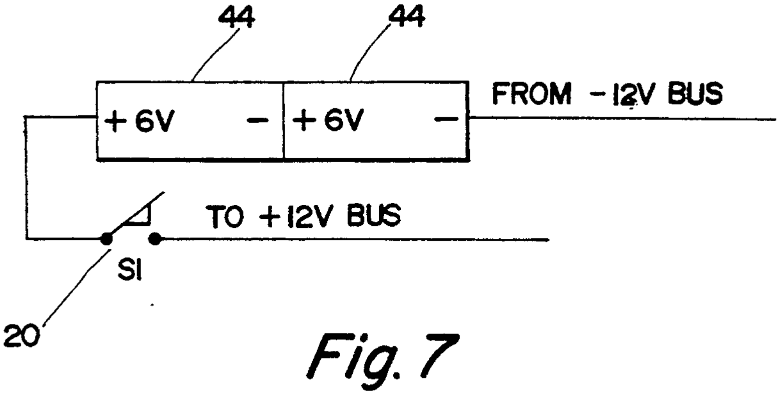
Figure 5:
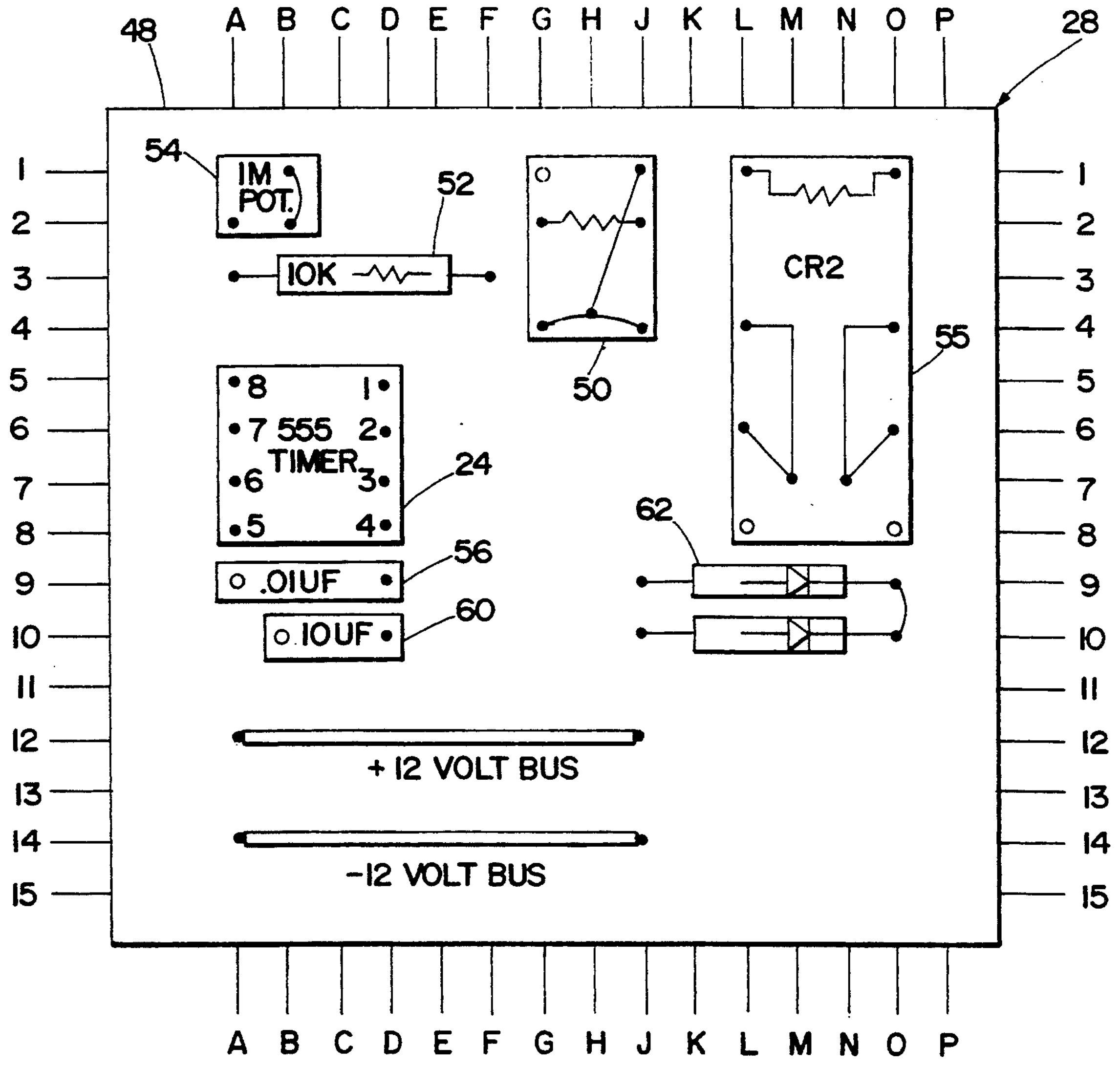
FIG. 5 is a schematic view of an integrated circuit board used in the vehicle marking device.
Figure 8:
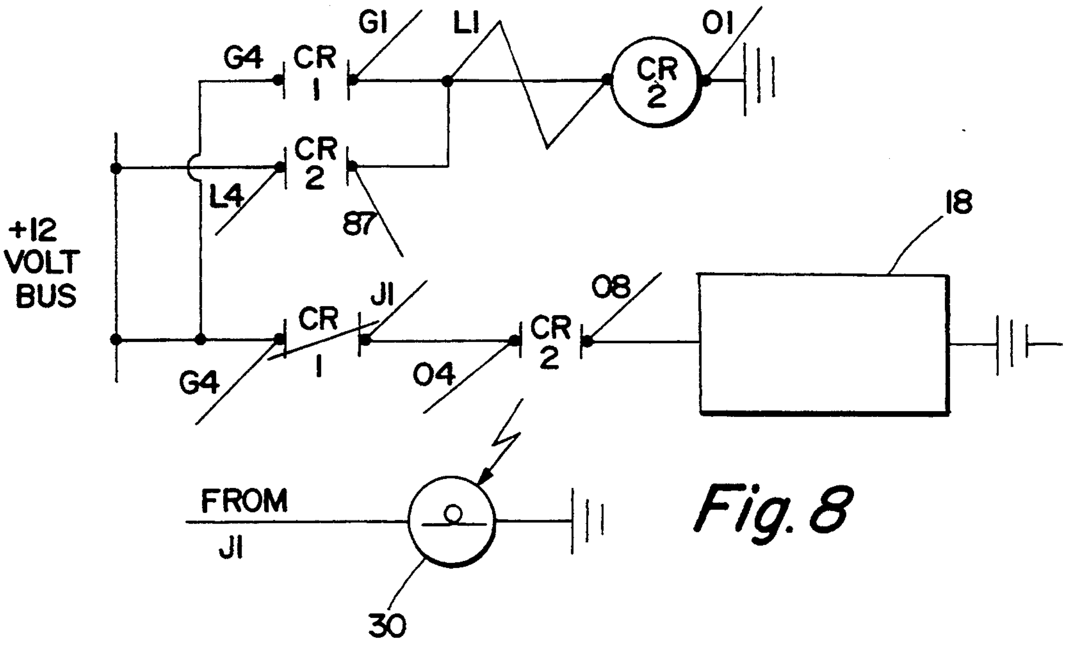

A vehicle marking device 10 according to the present invention is in the form of a self-contained, portable unit 12 that may be attached to the person of a law enforcement officer for immediate and convenient access. Alternatively, this unit 12 may be attached to a convenient location in the patrol car of a law enforcement officer. The unit 12 is designed for easy attachment to an exterior surface of an apprehended vehicle preferably by using a suction cup 14 or a magnet (not shown).

The self-contained, portable unit 12 comprises a pair of plastic pouches or sacs 16 containing dye, a pair of explosive cartridges 18 for rupturing the pouches 16 and expelling the dye, a master switch 20, an inertia (i.e. motion activated) switch 22, and a timer 24. The portable unit 12 also includes an integrated circuit board 28. When the master switch 20 is turned on, the portable unit 12 is armed and placed in a standby mode. The law enforcement officer is visually reminded by flashing lights 30 that the portable unit 12 is armed. Alternately, this L.E.D. (Light Emitting Diode) may stay lit when 12 is armed and will flash when motion is detected (or vice-versa). The inertia switch 22 remains open if the unit 12 is stationary but closes momentarily when it senses motion such as caused by vibration or acceleration.

Preferably, the inertia switch 22 includes a metal pin 32 protruding from and sealed to the top of a metal can 34. The pin 32 is normally mounted in a vertical orientation but the inertia switch 22 will operated properly with the pin 32 in any orientation. The inertia switch 22 closes in a few microseconds when motion is sensed and then opens when the motion ceases. The closing of the inertia switch 22 triggers the timer 24 into a time delay sequence, and the flashing lights 30 that indicated the stand-by mode are turned off. This alerts the law enforcement officer that the timer 24 is counting down to a time when the explosive cartridges 18 will be fired. While the countdown is proceeding, the law enforcement officer may reset the unit 12 by turning the master switch 20 off and then on again. If the apprehended vehicle starts moving away from the law enforcement officer, the timer 24 completes its countdown and the explosive cartridges 18 are fired, forcibly rupturing the sacs 16 and ejecting the dye onto an exterior surface of the apprehended vehicle. The time delay feature gives the law enforcement officer sufficient time to stop ejection of the dye, if desired, and allows the apprehended vehicle to depart to a safe distance away from the law enforcement officer before the dye is expelled. Other types of inertia switches include tube type SPST mercury switches mounted in/on an "L" shaped bracket, etc. The law enforcement officer then attached the unit 12 to the apprehended vehicle by pressing the suction cup 14 onto any relatively flat, smooth exterior surface on the vehicle. As the unit 12 is attached to the vehicle, the law enforcement officer arms it by turning on the master switch 20. The flashing lights 30 are activated and flash approximately two times per second. If the apprehended vehicle starts moving away from the scene, the inertia switch 22 closes and the timer 24 goes into its countdown mode. The flashing lights 30 are turned off thus alerting the law enforcement officer that the timer 24 is counting down or the other alternatives.

At the end of the countdown mode, a set of contacts are actuated thereby closing a circuit. This fires the explosive cartridges 18 which eject the dye from the pouches 16 onto the exterior surface of the vehicle. The countdown feature permits the vehicle to be about 40 to 50 feet from the scene before the dye is ejected. In a situation where the apprehended vehicle does not attempt to leave the scene unlawfully, the law enforcement officer removes the unit 12 after disarming it by turning the master switch 20 off.

Preferably, the unit 12 is constructed as a container 36 formed of molded plastic with removable top and front/bottom panels 36*a*, 36*b* and 36*d*, respectively. The container 36 is about 5 inches long, 3½ inches high and 3 inches deep. The suction cup 14 or a magnet (not shown) is fastened to the bottom of the container 36. The dye sacs 16 and the explosive cartridges 18 are located in compartments 38 on either side of the suction cup 14. When the explosive cartridges 18 are fired, the dye will be ejected through two nozzles 40 onto the vehicle. The explosive cartridges 18 may be model rocket propellant, $CO_2$ gas, or other means.

The container 36 has a central chamber 42 containing the integrated circuit board 28, two batteries 44, and other electronic components for operating the unit 12. Electrodes (not shown) extend from the explosive cartridges 18 for connection to the timer 24. The explosive cartridges 18 are pointed downwardly in order to eject the dye past the suction cup 14. A suction cup release button 46 extends into the central chamber 42 between the explosive cartridges 18. The flashing lights 30 are located inside the container 36. Optionally, a bypass switch (not shown) may be used to bypass the timer 24 and instantly fire the explosive cartridges 18 at the officer's command.

The components of the integrated circuit board 28 include a predrilled board 48; a 5 volt coil relay 50 such as Radio Shack part no. 275-240; a 10 k ½ watt resistor 52 such as Radio Shack part no. 274-034; a 1 megohm ½ watt potentiometer 54, clarostat type 367-T; a 0.01 uF capacitor 56 such as Radio Shack part no. 275-249; a 6–12 volt dc relay 58 such as Radio Shack part no. 275-249; a 10 uf capacitor 60 such as Radio Shack part no. 272-1025; and a pair of switching diodes 62 such as Radio Shack part no. 276-1122.

The vehicle marking device 10 is wired electrically in the following manner: from +9 volt bus to A2-A3-A5-D8; from B2 to A6-A7-B10; from C10 to ground//from D5 to ground; from A8 to A9//C9 to ground; from D7 to J9//from N9 to J2//J10 to ground; from G2 to ground; from +9 volt bus to G4; from F2 to D6 to pin 32 of inertia switch 22//from can 34 of inertia switch 22 to ground; from G1 to L1//01 to ground; from +9 volt bus to L4//L8 to L1; from J1 to 04//from J1/04 to flashing lights 30; from 08 to explosive cartridges 18; and explosive cartridges 18 to ground.

The positive side of this 9 volt unit is connected to one pole of the master switch 30 which is located in the top panel 36*a* of the container 36. The other pole of the master switch 20 is connected to the +9 volt bus. The negative side of the 9 volt battery unit is connected to the −9 volt bus.

What is claimed is:

1. A self-contained, portable device for marking motor vehicles, comprising: a sac containing dye; explosive means, proximate said sac, for rupturing said sac and expelling said dye onto an exterior surface of a motor vehicle; electronic control means for firing said explosive means; switch means comprising an inertia switch for detecting motion of the motor vehicle and for activating said electronic control means; a container holding said sac, said explosive means, said electronic control means, and said switch means; and means for attaching said container to the exterior of the motor vehicle whereby, upon activation of said electronic control means by said switch means, said sac is ruptured, expelling dye onto the exterior of the motor vehicle.

2. The marking device of claim 1, wherein said electronic control means further comprises timer means for delaying firing of said explosive means for an adjustably predetermined period of time after said inertia switch detects motion.

3. The marking device of claim 1, wherein said attaching means comprises a suction cup.

4. The marking device of claim 1, further comprising a battery in said container for supplying power to said electronic control means.

5. A device for marking motor vehicles, comprising: a sac containing dye; explosive means for rupturing said sac and expelling said dye onto an exterior surface of a motor vehicle upon electrical energization; a master switch for arming and disarming the marking device; an inertia switch for detecting motion of the motor vehicle, said master switch and said inertia switch being electrically connected to said explosive means; and a timer for delaying firing of said explosive means for a predetermined time after said master switch arms the marking device and said inertia switch detects motion.

6. A self-contained, portable device for marking motor vehicles, comprising: a sac containing dye; explosive means, proximate said sac, for rupturing said sac and expelling said dye onto an exterior surface of a motor vehicle; electronic control means for firing said explosive means, said electronic control means comprising a master switch for arming and disarming the marking device; switch means for activating said electronic control means; a container holding said sac, said explosive means, said electronic control means, and said switch means; and means for attaching said container to the exterior of the motor vehicle whereby, upon activation of said electronic control means by said switch means, said sac is ruptured, expelling dye onto the exterior of the motor vehicle.

* * * * *